May 4, 1948.　　　A. A. HERRMAN　　　2,440,949
PUZZLE
Filed Feb. 16, 1946

Arnold A. Herrman
INVENTOR

Patented May 4, 1948

2,440,949

UNITED STATES PATENT OFFICE 2,440,949
PUZZLE

Arnold A. Herrman, New York, N. Y.

Application February 16, 1946, Serial No. 648,098

1 Claim. (Cl. 273—113)

The invention relates to puzzles and particularly to that class of puzzle where the skill of the user is exercised in guiding balls to given points.

I provide a puzzle, including a base having a rim for confining mounds and balls.

The mounds are shaped in such a way and placed on the base as to make V-shape entrance towards a center.

In each entrance near the center is a small depression or hole for holding the balls if base is level or tipped a very little when balls roll on them.

The accompanying figures of drawing are a preferred embodiment of my invention.

In the illustrated embodiment of my invention there is shown a base No. 1 with rim No. 2 making a complete box of wood or other suitable material.

The No. 3 are mounds made of wood or other suitable material. The balls are No. 4 and the depressions or holes are No. 5. The depressions or holes are preferably small, being large enough merely to provide seats for balls 4.

In the illustration are five balls in the outer part and capable of rolling and entering the entrances and resting on the depressions or holes and are small enough to overlap the center but too large to enter the center.

A single ball 6, is placed in the center and is too large to roll and enter the entrances but small enough to overlap the entrances and capable of hitting any of the balls in the entrances that are resting on the depressions or holes and thereby capable of making them roll off.

Figure 1:
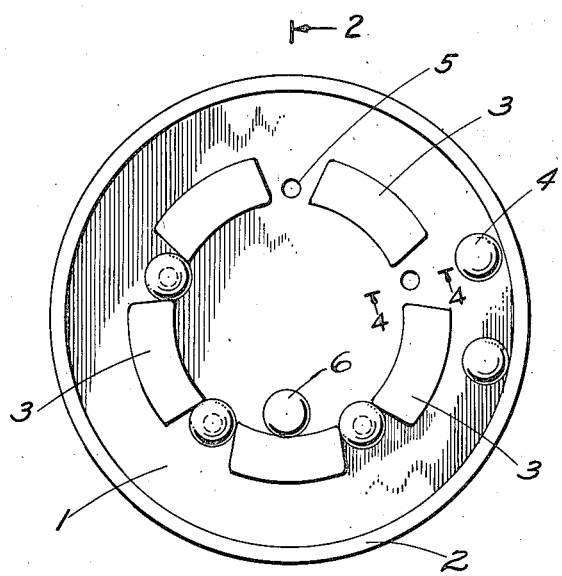
Figure 1 represents a plan view of the puzzle, showing the balls assembled around the mounds, with some of the balls located in the passageways, between the mounds.
Figure 2:
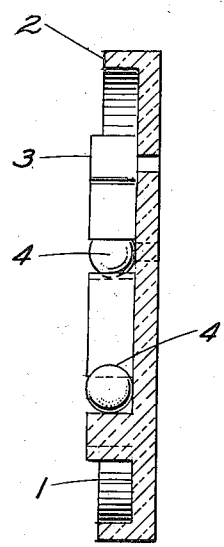
Figure 2 is a vertical section, taken at line 2—2 of Figure 1.
Figure 4:
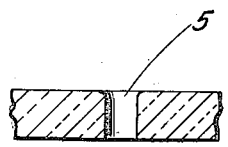
Figure 4 is a section taken at 4—4, Figure 1, showing a straight hole thru the base for locating the ball within the radial passageway.
Figure 5:
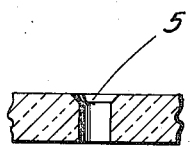
Figure 5 is a section thru the base similar to Figure 4, showing a countersunk hole, thru the base.
Figure 3:
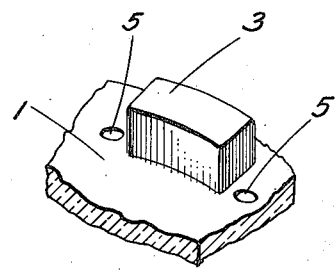
Figure 3 represents a modified perspective view of one of the mounds.
Figure 6:
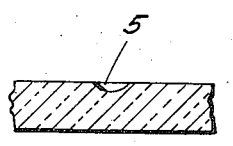
Figure 6 is a section, similar to Figure 4, showing a depression or groove in the form of a spherical segment, in place of the hole of Figures 4 and 5.
Figure 7:
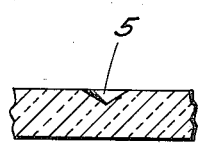
Figure 7 shows a section, similar to Figure 6, showing a conical depression, in place of the spherical segmental groove of Figure 6.

Figure 3 shows one of the mounds. The sides of mounds 3 are rectangular and the adjacent sides of two mounds form a passageway which becomes narrower towards the center. The innermost parts of the passageways are so narrow that balls 4 are unable to pass all the way through, but as shown in Figure 1, the balls may project partially.

The puzzle is complete when each one of the five balls are resting on a depression or hole.

I claim:

A puzzle comprising a base, a rim around the periphery of said base, mounds on said base intermediate the center thereof and said rim, said mounds providing passageways therebetween connecting the inner central portion of said base to the outer peripheral portion thereof, the inner openings of said passageways being narrower than the outer openings, a hole or depression in each of said passageways, a ball disposed in the inner portion of said base, said ball having a diameter larger than the width of the inner opening of each passageway, balls disposed in the outer portion of said base, said last named balls being adapted to seat in said depressions and each ball being of a diameter greater than the width of said inner openings but being adapted to project partially therethrough.

ARNOLD A. HERRMAN.

REFERENCES CITED

The following references are of record in the file of this patent:

UNITED STATES PATENTS

| Number | Name | Date |
|---|---|---|
| 807,600 | Clouser | Dec. 19, 1905 |
| 1,353,462 | Duggan | Sept. 21, 1920 |